Sept. 6, 1966 H. NERWIN 3,270,642
PHOTOGRAPHIC PRODUCT AND APPARATUS
Filed Sept. 13, 1963 2 Sheets-Sheet 1

HUBERT NERWIN
INVENTOR.

BY
ATTORNEYS

Sept. 6, 1966   H. NERWIN   3,270,642
PHOTOGRAPHIC PRODUCT AND APPARATUS
Filed Sept. 13, 1963   2 Sheets-Sheet 2
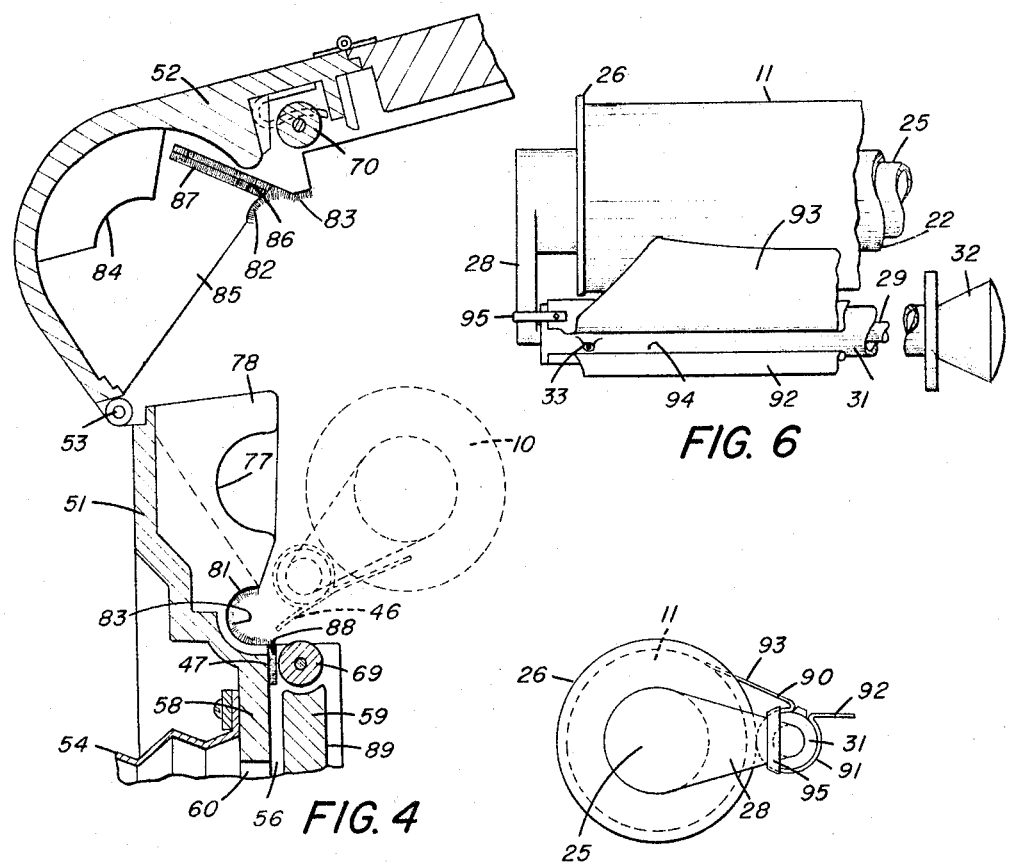
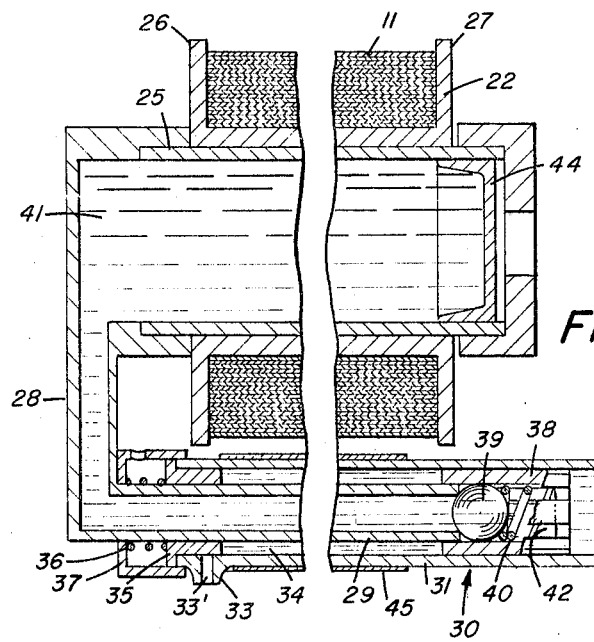
HUBERT NERWIN
INVENTOR.
BY R. Frank Smith
Robert F. Crocker
ATTORNEYS

United States Patent Office 3,270,642
Patented Sept. 6, 1966

3,270,642
PHOTOGRAPHIC PRODUCT AND APPARATUS
Hubert Nerwin, Rochester, N.Y., assignor to Eastman Kodak Company, Rochester, N.Y., a corporation of New Jersey
Filed Sept. 13, 1963, Ser. No. 308,902
9 Claims. (Cl. 95—13)

This invention relates to an improved photographic product and apparatus particularly useful in the image-transfer photographic field.

Processing cameras which utilize an image transfer system are well known in the photographic art. In such cameras each frame of a sensitized film strip is exposed and then is sandwiched with a corresponding portion of a strip of image receptive material with a layer of processing fluid therebetween. The fluid initiates development of the exposed image and causes transfer to the receiver sheet of a positive image obtained therefrom. It is customary with apparatus of this type to provide two rolls of strip material, one the photosensitive strip and the other the strip of receiving material, the latter usually carrying individual pods or containers of processing fluid. While these two rolls of material normally have their leaders fastened together, they are mounted in the camera at opposite ends and it is relatively inconvenient to properly load the material into the camera. Moreover the use of individual rupturable pods involves a relatively expensive receiver strip construction and requires that the roll of receiver material be considerably more bulky than would otherwise be required.

It is an object of this invention to overcome the above difficulties by providing a composite roll of photosensitive and receiver material combined with a container holding sufficient processing fluid for the processing of the entire strip of sensitized material and a metering type fluid applicator for applying sufficient fluid to the strip materials for each processing operation.

It is a further object to provide such a product wherein the fluid is contained within the hollow interior of the coil of strip material.

A further object is to provide a processing camera adapted to receive, expose and process my improved film product.

Further objects will become apparent from the following description and claims particularly when considered in the light of the accompanying drawing wherein:

FIG. 4 is a fragmentary section also showing the camera opened for loading.

FIG. 5 is an enlarged fragmentary cross-sectional view of the composite film and applicator assembly.

FIG. 6 is a fragmentary view of a slightly modified form of roll film product incorporating the invention, and FIG. 7 is an end view of the embodiment shown in FIG. 6.

Figure 1:
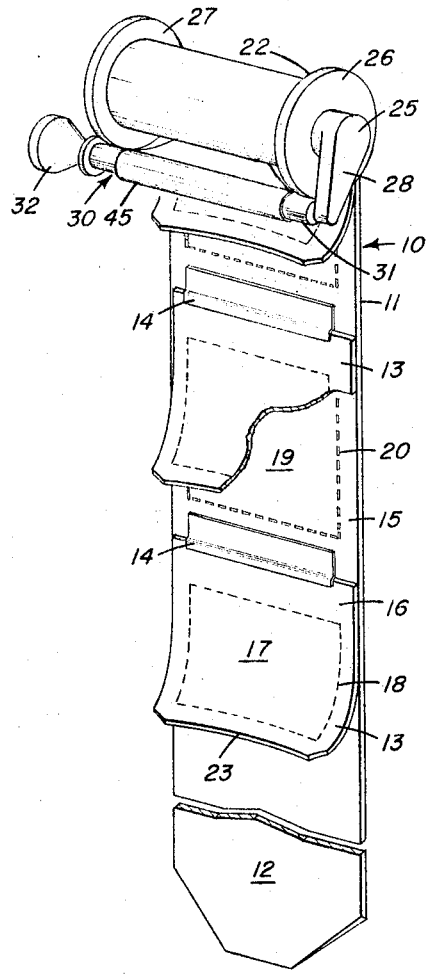
FIG. 1 is a perspective view showing my improved film product and fluid supply, with the strip material partially unwound from its roll to better show its construction.

In FIG. 1 I have shown my invention as applied to a composite film product of the "shingled" type which is the subject matter of my co-pending application Serial No. 227,312, filed October 1, 1962 and to which reference may be made for specific details. However for purposes of understanding the present invention the following description thereof is believed to be sufficient. This composite roll film product 10 is shown in FIG. 1 and comprises an elongated strip 11, at least the leading end portion 12 of which is opaque, and which carries at spaced locations along the length thereof a plurality of individual image receiving sheets 13. Each of the sheets 13 is hingedly secured, as by hinge strips 14, along its trailing edge to the inner or front face 15 of the strip 11. The face 15 of strip 11 and the outer face 16 of each sheet 13 are provided with associated pairs of image receiving areas 17 and 19, one of which is photosensitive and the other of which is adapted to receive an image by transfer and which are adapted to be placed in face-to-face relationship for conjoint processing when the hinged sheet is inverted about its hinge on the strip. In the particular form shown in FIG. 1 at least that portion of the outer face 16 of each sheet 13 within the dashed line 18 constitutes the image area 17 thereon and is formed of a photosensitive material as is well-known in the art. The transfer image receiving area 19 for each pair is carried on that portion of strip 11 immediately rearwardly of the hinged end of the associated sheet 13. Preferably the transfer-image receptive area 19 is outlined by perforations 20 so that, after image transfer has occurred, the area 19 may be removed from strip 11 to give the finished positive print.

The composite product is initially supplied in roll form, preferably being wound on a suitable spool 22, the strip being so arranged on the spool that the sheet-bearing face 15 is on the inner side of each convolution. This causes the sheets 13 to assume a "curl" or curvature such that when the strip is unwound from the spool the leading edge 23 of each sheet tends to curl slightly away from the adjacent surface of the strip 11. As hereafter explained this curling tendency facilitates the feeding of the sheet into proper position for exposure.

In accordance with my invention the previously mentioned processing fluid is contained within a container which is assembled with the roll of film material and which includes a metering type of applicator. The arrangement of the roll, the container and applicator is best shown in FIG. 5 where it is seen that spool 22 is rotatably mounted on a cylindrical container 25, the ends of which extend somewhat beyond the flanges 26 and 27 of spool 22. The left-hand end of container 25 is connected to and in fluid communication with a generally radially extending hollow arm 28 the outer end of which in turn is rigidly connected to the left-hand end of a relatively small diameter hollow tubular member 29 which extends parallel to the axis of the spool and which constitutes one element of the metering applicator 30. Surrounding tube 29 and mounted thereon for relative telescopic sliding movement is a second tubular member or plunger 31 which is closed at its right-hand end and is provided at that end with an actuating handle or knob 32 by means of which it may be extended or retracted relative to the remaining portion of the applicator. As is shown in FIG. 5 the inside diameter of tubular plunger 31 is somewhat larger than the outside diameter of tubular member 29. Near the left-hand end of plunger 31 a nozzle 33 is provided having an opening 33' extending through to the interior 34 of member 31. Communication between this opening and the space 34 is controlled by a sleeve type check valve 35 mounted for limited axial sliding movement on tube 29 and normally spring urged toward its nozzle-blocking condition by means of a light spring 36 bearing against the end cap 37 of plunger 31. Cap 37 also serves to slidably support the left end of plunger 31 in coaxial relationship with tube 29. At the right-hand end of tube 29 there is provided a slotted cap or cage member 38 which is secured to the end of tube 29 and serves as a second slidable bearing support for the plunger 31. This cage 38 also may conveniently house a second, ball type, check valve 39 which is normally urged into position closing the open end of tube 29 by a spring 40 acting against the end wall of the cage 38.

This entire assembly of the container and applicator is initially completely filled with the appropriate processing fluid 41, which, as is customary in the image transfer art, is preferably of relatively high viscosity.

It can be seen that the above arrangement of tubes 29 and 31 and valve members 35 and 39 constitutes a metering type plunger pump. Thus, when handle 32 is pulled, check valve 39 will open and fluid will be drawn from the interior of container 25 into the chamber 34 of the plunger maintaining the latter filled, the slots 42 in the cage 38 permitting relatively unrestricted flow of this fluid throughout the chamber. When handle 32 is then pushed inwardly, check valve 39 will reclose and the resulting pressure within chamber 34 will open check valve 35 to permit the fluid to be forced out of nozzle 33. Since during this movement nozzle 33 will be moving transversely across the width of the film strip, the discharged fluid will be deposited in the form of a bead 43 (see FIG. 2) extending across the width of the strip. In order to permit withdrawal of the fluid from the container 25 the container is provided with a movable end wall 44 which will be displaced toward the left-hand end of the container as the fluid is withdrawn therefrom. While movable wall 44 is shown herein as a relatively close fitting piston-like member, it is obvious that a flexible membrane would serve this same purpose.

Figure 2:
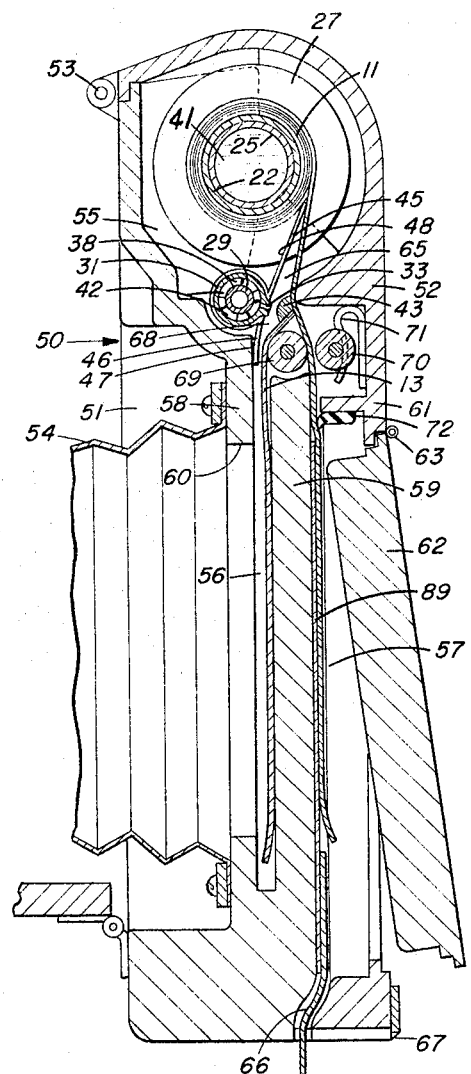
FIG. 2 is a fragmentary cross-section of a camera for use with my improved film product and showing the manner in which the product is arranged within the camera.

In order to insure that the bead 43 of processing fluid is deposited in proper relationship on the strip 11, it is desirable that the nozzle 33 be maintained at a given orientation about the axis of the plunger throughout its movement. While in FIG. 5, in order to better show the construction, the plunger 31 with its nozzle 33 has been illustrated as having been rotated somewhat about its axis from its proper operative position, the desired operating orientation is shown in FIG. 2. To hold the nozzle in this desired orientation, a thin strip 45 of spring material is secured to the periphery of plunger 31 and is provided with a short lip portion 46 which is adapted to project generally away from the roll of film material and, when the latter is mounted in a camera to cooperate with an abutment surface 47 in the camera (see FIG. 2) to prevent rotation of the plunger about its axis. At the opposite side of the plunger the spring member 45 extends toward the coil of film material and into position wherein it serves as a stripper 48 to insure that the leading end 23 of each hinged sheet 13 is guided along the proper path in the camera.

Figure 3:
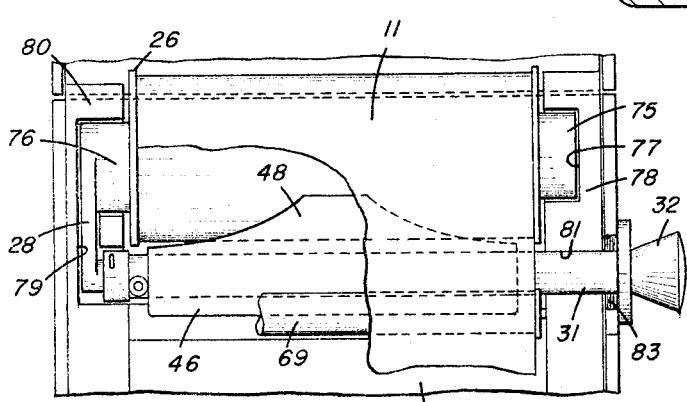
FIG. 3 is a fragmentary rear view showing the camera opened for loading.

Turning now to FIGS. 2, 3 and 4 there is shown a camera structure of the general type described and claimed in my co-pending application Serial No. 282,070, filed May 21, 1963, and which is adapted to utilize the above-described film product. As best shown in FIG. 2 the camera comprises a main housing 50 which includes a front body section 51 and a rear body section 52 hingedly secured together as at 53. Suitable latch means, not shown, will, of course, be provided to hold the rear section 52 in its normal closed position with respect to front section 51 and as indicated in FIG. 2. The front body section 51 carries the usual bellows 54, at the forward end of which will be supported the conventional lens, shutter, etc. (not shown).

As best shown in FIG. 2 the housing sections 51 and 52 conjointly provide three interconnected chambers 55, 56 and 57. The first of these, chamber 55, serves as a supply chamber in which the film product is initially loaded and from which it is drawn during operation of the camera. The second chamber 56 is in the form of a relatively narrow space between the front and rear walls 58 and 59 of the front body section and is adapted to receive the individual sheets 13 and to hold them in proper position for exposure. A suitable exposure opening 60 is provided in the front wall 58 to provide for such exposure. The third chamber 57 is located between the rear wall 59 of the front body section and the rear wall 61 of the rear body section and constitutes a processing chamber adapted to hold the exposed film sheet and associated portion of the receiver strip while the development and image transfer operations are in progress. Back wall 61 is preferably provided with a door 62 hingedly secured thereto as indicated at 63 and which is shown in FIG. 2 as being partially open. Normally this door will be latched shut (by latch means not shown) but may be opened after processing has been completed to permit removal of the finished print. The housing sections 51 and 52 are also arranged so as to provide a continuous passageway 65 extending from the supply chamber 55 to and through the processing chamber 57 and terminating in an exit slot 66 at the lower end of the latter. As indicated in FIG. 2 the strip 11 is adapted to extend from the supply chamber, along this passageway, through the receiving chamber, and then out through the exit slot 66 so that its end may be manually grasped to perform the desired manipulations of the film product during operation. A cutter 67 is provided adjacent exit slot 66 to facilitate removal of excess material protruding through the slot.

The upper end 68 of exposure chamber 56 constitutes a sheet receiving mouth which communicates directly with the supply and processing chambers 55 and 57 and is so positioned relative to the path of travel of strip 11 along passageway 65 that the leading end of each sheet 13 will, due to its natural curl and the relative position of the parts, be directed into the sheet receiving exposure chamber 56 as the leading end of the strip 11 is pulled to move the strip along passageway 65. The thin stripper member 48 carried by the composite film product, as previously described, and which bears lightly against the roll of film material in the supply chamber, assists in directing the free end of the sheets into the exposure chamber.

Located along passageway 65 at the upper end of the processing chamber 57 is a pair of pressure rollers 69 and 70, one of which is preferably resiliently urged toward the other as by a suitable spring 71. As shown in FIGS. 2 and 4, roller 69 is carried by the front housing section 51 while roller 70 is carried by the rear housing section. The path of movement of strip 11 extends between these processing rollers.

To prevent accidental exposure of the film material when door 62 is opened to remove a finished print, a suitable light seal 72 is preferably interposed between the door and the processing roller 62 and 70.

The film and applicator assembly 10 is held in proper position within the supply chamber 55 by engagement of the end portions 75 and 76 of the container and of the arm 28 and plunger 31 with appropriately shaped grooves and projections on the housing sections 51 and 52. Thus, as best shown in FIG. 3 the right-end portion 75 of container 25 is received within a substantially semicircular groove 77 in the right-hand side wall 78 of the front housing section 51. The opposite end of the container and the arm 28 are received within an appropriately shaped groove 79 in the left side wall 80 of the front housing section 51. The right-hand end of plunger 31 is slidably supported within an opening formed by cooperating generally semicircular grooves 81 and 82 in the front and rear housing sections 51 and 52 respectively (see FIGS. 3 and 4). Around this latter opening is provided a suitable light sealing material 83 to prevent any light leak around the plunger 31, while the plunger and its handle are of opaque material so that light cannot be transmitted through them to the interior of the camera. As best seen in FIGS. 2 and 4, suitably shaped abutments 84 are provided on the inner faces of the side walls 85 of the rear housing section 52 to assist in holding the film and applicator assembly 10 securely in its operative position in the grooves of the front housing section.

Since, in the above-described embodiment of the film and applicator product, the spring-like stripper member is secured directly to the plunger 31 it will move axially therewith when the plunger is actuated during the fluid application operation. In order to permit such movement, the right-hand side wall 85 of the rear housing section is provided with a slot 86 merging with the semi-circular groove 82 and positioned so that the stripper member may slide therethrough. Slot 86, like groove 82 is provided with a suitable light seal 87 to permit such operation without allowing light to enter the interior of the camera. A similar light-sealed slot 88 is provided in the front housing section 51 to accommodate movement of lip 46.

In the operation of my improved camera and film product the camera is loaded by opening the rear housing section 52 as shown in FIG. 4. This exposes the supply chamber 55, and the roll of film product 10 with its integral applicator 30 may then be readily inserted into its operative position in the grooves 77, 79 and 81. As is indicated by the dashed lines in this FIG. 4, the roll assembly is manipulated during this operation so that the lip 46 first moves into position between the pressure roller 69 and wall 58 of the front housing section 51 and then the assembly is more or less swung in counter-clockwise fashion as viewed in FIG. 4, to seat the container and applicator in their mating grooves.

Once the roll 10 of composite film product has been thus mounted, the leading end of the strip 11, which, of course, constitutes the outer convolutions of the coil of material, is pulled from the roll and laid across the rear face 89 of the rear wall 59 of the front body section, sufficient amount of the strip being unwound so that its end portion will extend slightly beyond the lower end of the camera. The rear section 52 of the camera will then be swung about its hinge 53 into closed position thereby automatically bringing pressure rollers 69 and 70 into proper operative relationship. The user will then pull the end of the strip 11 which extends outwardly from the exit slot 66, so as to draw that portion of the strip carrying the first of the individual photosensitive sheets 13 from the roll. As he thus draws strip 11 downwardly, the leading edge 23 of this first sheet will slide along the rear surface of stripper 48 and will pass forwardly of the roller 69 and partition 59 and into the sheet receiving exposure chamber 56. Sheet 13 will continue to move, leading edge foremost, into chamber 56 until the strip 11 has been moved sufficiently to bring the hinge connection 14 by which the sheet is hinged to the strip fairly close to roller 69, substantially as shown in FIG. 2. At this time there will occur a very definite increase in resistance to further movement of the strip and this abrupt increase will indicate to the user that the photosensitive sheet is in position for exposure and that further movement of the strip should be discontinued.

After the operator has exposed the photosensitive image area on sheet 13 he will grasp the handle 32 of plunger 31 and pull the plunger outwardly as far as it will go, to draw a charge of processing "goo" or fluid into the pumping chamber 34. He will then immediately press plunger 32 back to its original position, this return movement, as previously explained, causing the measured charge of fluid to be deposited as a bead 43 across the width of the strip adjacent the hinge 14.

The operator will once again grasp the end of strip 11 and, by exerting sufficient force, will pull the hinge connection past the mouth of chamber 56 and into the bite of pressure rollers 69 and 70. As he thus continues to pull strip 11, the exposed sheet 13 will be pulled back around roller 69 and out of the exposure chamber 56, moving along with the strip, hinged-end first, between the two pressure rollers. This movement will also cause the bead of fluid to be spread evenly between the now-facing pair of associated image areas 17 and 19 as they are drawn between the pressure rollers. Thus, during this operation the exposed photosensitive sheet will be pulled, hinged-end first, entirely out of the exposure chamber 56, and effectively inverted upon and laminated to strip 11 with a layer of processing fluid between the pair of image areas.

During this spreading operation, the leading edge of the next succeeding sheet 13 will enter the exposure chamber 56. The spacing of the sheets on the strip and the relationship of parts is preferably substantially as shown, so that the succeeding sheet will be moving into the exposure chamber at the same time that an exposed sheet is being withdrawn therefrom. In fact, as discussed in my aforesaid copending application Serial No. 282,070, the two sheets will partially overlap in the exposure chamber throughout a substantial portion of this movement. Moreover the spacing of the sheets on strip 11 and the relative location of the chambers 56 and 57 will preferably be such that the image areas on the sheet and strip which are undergoing processing will lie entirely within the processing chamber 57 at the same time that the next succeeding sheet has reached the proper position for exposure in the exposure chamber, when, as previously explained, there will again occur an abrupt increase in resistance to movement of the strip. After the necessary processing time has elapsed the operator may open the door 62 and separate the finished print from strip 11, perforations 20 facilitating such separation. The excess length of strip 11 extending out through the slot 66 may be conveniently separated from the remainder of the strip with the aid of the cutting blade 67 against which the web may be brought to sever the undesired end portion. The apparatus is then in condition for another exposure and processing cycle.

It is not necessary that the stripper assembly be movable with plunger 31, and FIGS. 6 and 7 show a slightly modified form of composite film product wherein the stripper is so mounted that it will remain stationary during operation of the plunger. Except as specifically pointed out below, the same reference numerals are used to identify those parts which are the same as in the earlier described embodiment. In this embodiment the spring strip 90 from which the stripper is formed is shaped to provide a generally cylindrically curved portion 91 which, instead of being fixed to the plunger 31, slidably receives the plunger. The strip material is then substantially reversely bent as shown in this figure to form the positioning lip 92, corresponding to lip 46 of the earlier embodiment and the generally oppositely extending stripper portion 93. There is thereby formed a slot 94 between the lip and stripper which serves to slidably guide the nozzle 33 during its movement. Strip 90 may be secured against unwanted movement laterally of the camera and filmstrip by means of a U-shaped strap 95 which encircles the free end of arm 28 and is secured at its ends to the portion 91.

Operation and use of this form of film product is substantially identical to that previously described and need not be repeated. Since the stripper member does not move with the plunger, there is, of course, no necessity for providing the slot 86 in the housing, but the presence of this slot in a camera would in no way prevent use of a product of the type shown in FIGS. 6 and 7.

Thus it is seen that my improved film product and processing camera of the type described above greatly simplify the problem of handling the materials and loading the camera as well as providing a much simpler camera structure than that previously used in the image transfer art. While my invention is of particular advantage when a composite roll of film and receiver material is used therewith, it is obvious that it could be equally well applied to a film product where only one of these materials was carried on the roll surrounding the container. Thus, for example, the invention would be usable in conjunction with image transfer film having separate rolls of film and receiver material, the applicator assembly preferably being combined with the roll of receiver material. Obviously with such a film product the usual rupturable pods would be replaced by the container and applicator.

While I have described in detail but two embodiments of my invention, it is believed obvious that many changes could be made without in any way departing from the

I claim:

1. A composite product for use in image-transfer photography, comprising:
   an elongated strip having a leading end portion,
   at least predetermined spaced areas on one face of said strip being image receptive,
   a plurality of sheets, one corresponding to each of said image-receptive areas,
   each sheet being individually hingedly secured to said face of said strip adjacent the leading edge of the corresponding image-receptive area and extending therefrom toward said leading end portion of said strip,
   each said sheet being provided with an image-receptive area facing outwardly from said strip and arranged upon inversion of said sheet about its hinge connection with the strip for conjoint processing in substantially face-to-face relationship with its associated image-receptive area on the strip,
   one of each associated pair of image-receptive areas being photosensitive,
   said strip being wound upon itself in the form of a hollow, multi-layer coil with said leading end portion outermost,
   a fluid container at least a portion of which is housed within the hollow interior of said coil,
   and fluid applicator means connected to and in fluid communication with said container and located radially outwardly from the periphery of said coil in position to apply fluid from said container to selected portions of said strip and sheet assembly upon unwinding of the latter from said coil.

2. In combination with a product as in claim 1,
   a housing providing a supply chamber,
   said coil being mounted within said chamber,
   said housing including means for guiding strip material unwound from said coil along a predetermined path leading from said supply chamber
   and means forming a sheet-receiving chamber having a mouth positioned adjacent said path,
   means mounting said product in said supply chamber so that said applicator is supported in a position adjacent said path intermediate said coil and said mouth,
   and means extending from said coil to said mouth for guiding the leading end of each sheet past said applicator and into said mouth upon movement of the associated portion of said strip along said path in a direction away from said coil.

3. Photographic apparatus for use with a product as defined in claim 1, said apparatus comprising:
   a housing providing a supply chamber, adapted to receive said product,
   means for guiding strip material drawn from the coil of such product along a predetermined path extending from said supply chamber,
   means forming a sheet-receiving chamber having a mouth positioned adjacent said path,
   and means for supporting said product in said supply chamber so that the fluid applicator thereof is located adjacent said path intermediate the coil and said mouth in position to apply fluid to strip material located in said path.

4. A product as in claim 1,
   said applicator including a portion extending transversely across the width of said coiled strip,
   and said strip being wound in said coil so that said sheets are on the inwardly facing side of the convolutions of said coil,
   and means carried by said applicator for guiding the leading edge of each sheet past said transversely extending portion upon unwinding of said strip from said coil.

5. Photographic apparatus for use with a product as defined in claim 4, said apparatus comprising:
   a housing providing a supply chamber, adapted to receive said product,
   means for guiding strip material drawn from the coil of such product along a predetermined path extending from said supply chamber,
   means forming a sheet-receiving chamber having a mouth positioned adjacent said path,
   and means for supporting said product in said supply chamber so that the transversely extending portion of said applicator is positioned adjacent said path and between the coil and said mouth in position to apply fluid to strip material located in said path, and with the guide means on said applicator extending from the coil to said mouth.

6. In combination:
   (a) a composite photographic product comprising
      a fluid container having a supply of photographic processing fluid therein,
      a multi-layer coil of photographic image-receptive strip material surrounding said container,
      and means for applying fluid from said container to selected portions of said strip material,
      said fluid-applying means comprising a fluid applicator means located radially outwardly from the outer periphery of said coil and including a movable actuating member,
      and means movably connecting said applicator and its actuating member to said container for reciprocating movement relative thereto substantially parallel to the axis of said coil and including means for conducting fluid from said container to said applicator means; and
   (b) apparatus for processing said product comprising
      a housing having a supply chamber,
      means mounting said product within said housing with said coil and container mounted within said supply chamber,
      said housing including means for guiding strip material unwound from said coil along a predetermined path leading from said supply chamber,
      said fluid applicator means being positioned adjacent an intermediate location along said path in position to apply fluid to strip material which has been moved along said path from said coil to such location,
      and said housing being provided with an opening through which said actuating member of said fluid applicator extends to the exterior of said housing.

7. A composite photographic product comprising:
   a coil of photographic image-receptive strip material having a generally cylindrical hollow interior,
   means providing a supply of fluid located at least in part within said hollow interior of said coil,
   and means for applying fluid from said supply means to said strip,
   said fluid-applying means comprising fluid-discharge means located radially outwardly from the outer periphery of said coil and including a nozzle movable generally parallel to the axis of said coil,
   and means movably connecting said discharge means and its nozzle to said supply means for reciprocating movement relative thereto substantially parallel to the axis of said coil and including means for conducting fluid from said supply means to the nozzle of said discharge means.

8. A product as in claim 7, said fluid-conducting means including a portion extending generally parallel to the axis of said coil outwardly thereof and across at least a major portion of the width of said strip material,
   said fluid-discharge means being mounted on said portion of said fluid-conducting means for movement therealong substantially parallel to said axis.

9. A composite photographic product comprising:
a coil of photographic image-receptive strip material having a generally cylindrical hollow interior,
means providing a supply of fluid located at least in part within said hollow interior of said coil,
and means for applying fluid from said supply means to said strip, said fluid-applying means comprising fluid-discharge means located radially outwardly from the outer periphery of said coil,
and means connecting said discharge means to said supply means and including means for conducting fluid from said supply means to said discharge means,
said fluid-conducting means including a first portion extending generally parallel to the axis of said coil outwardly thereof and across at least a major portion of the width of said strip material,
said fluid-conducting means further including a second portion telescopically supported on said first portion and supporting said discharge means,
said first and second portions of said fluid-conducting means being arranged to conjointly form a pump operable to draw fluid from said fluid supply means and to force it from said discharge means.

References Cited by the Examiner

UNITED STATES PATENTS

| | | | |
|---|---|---|---|
| 2,837,987 | 6/1958 | Land | 95—66 |
| 3,152,529 | 10/1964 | Erlichman | 95—13 |

FOREIGN PATENTS 697,909   9/1953   Great Britain.

JOHN M. HORAN, *Primary Examiner.*